United States Patent [19]

Fink

[11] 4,251,921
[45] Feb. 24, 1981

[54] CALIPER AND CONTOUR TOOL

[75] Inventor: Conrad F. Fink, Los Alamos, N. Mex.

[73] Assignee: The United States of America as represented by the United States Department of Energy, Washington, D.C.

[21] Appl. No.: 61,149

[22] Filed: Jul. 26, 1979

[51] Int. Cl.³ ............................................. E21B 47/08
[52] U.S. Cl. ................................ 33/178 F; 33/178 E; 33/302
[58] Field of Search ............. 33/178 F, 178 E, 178 R, 33/174 R, 302; 166/200

[56] References Cited

U.S. PATENT DOCUMENTS

| 2,588,717 | 3/1952 | Goodwin | 33/178 F |
| 3,092,182 | 6/1963 | Blagg | 33/178 F |
| 3,349,498 | 10/1967 | Oliver et al. | 33/178 F |

*Primary Examiner*—Willis Little
*Attorney, Agent, or Firm*—Robert W. Weig; Paul D. Gaetjens; Richard G. Besha

[57] ABSTRACT

The disclosure relates to a tool for borehole logging comprising a plurality of extendable caliper arms to determine borehole contour.

6 Claims, 11 Drawing Figures

CALIPER AND CONTOUR TOOL

The invention is a result of a contract with the Department of Energy.

BACKGROUND OF THE INVENTION

Field of the Invention

The invention relates to borehole logging devices and more particularly to caliper tools for determining profiles of boreholes.

There is a need to determine profiles in various kinds of boreholes such as geothermal boreholes because irregular shaped and sized casings occur, rocks fall from one side of the hole, casings split, fractures occur and other events happen within the hole making periodic monitoring of the borehole advisable. Fracture orientation can be determined by utilizing three or more independent arms in accordance with the invention.

There exists a need for a reliable caliper tool which is operable at the high temperatures encountered in geothermal wells, i.e. on the order of about 250° C.

It is desirable that a caliper tool be accurate and that it can be raised and lowered repeatedly in the same downhole run.

In addition, the caliper and contour tool of the invention may be utilized to determine fracture orientation, shape and size in boreholes and can be utilized to determine the best place to set packers, cement, kick off and the like. Basically, tools of this nature are lowered to a point below the depth desired to be monitored and the arms are extended. The tool then is withdrawn at a preselected rate which can be either fast or slow. Calipers monitor contact with the walls of the hole and electrical signals are produced in accordance with their extension. The signals are monitored at the surface and a determination is made of the borehole's contour or profile. A tool may be repeatedly lowered and raised to obtain a plurality of readings to get a very complete picture of the borehole. There are devices well known in the art such as photographic compasses utilized to record North at various time intervals to determine the disposition of the arms within the borehole as well as inclinometers and magnetometers for determining the orientation of the tool within the hole so that an accurate three dimensional profile of the borehole is obtainable. Many other uses for borehole logging devices are well known to those skilled in the art and there is no need to explore them further herein.

Statement of the Objects

One object of the invention is to provide extremely accurate measures of borehole geometry.

Another object of the invention is to provide a continuous plot of average hole diameter.

One advantage of the invention is the ease of the maintenance of a preferred embodiment in accordance therewith.

Another advantage of the invention is that a real time output of borehole diameter is achievable.

Still another advantage is that the preferred embodiment enjoys low susceptibility to leakage into its internal portions.

Yet still another advantage is that each of the three arms in accordance with the invention operates completely independently of the other arms and is on the same horizontal level as the others.

Still yet another advantage is the number of arms can be increased to, for example, six arms if desirable.

Other objects, advantages and novel features of the invention will become apparent to those skilled in the art upon examination of the following detailed description of a preferred embodiment of the invention and the accompanying drawings.

SUMMARY OF THE INVENTION

The invention relates to a borehole caliper and contour tool suspendable from a logging cable comprising a generally tubular housing having a down hole end or head and an uphole end having centralizers extending from the housing near each end. The housing contains a reversible high temperature 250° C. D.C. electric gear motor connected to a source of electricity for driving extendable and retractable arm assemblies comprising collapsible arms and caliper arms disposed about the circumference of the housing. The tool is lowered into a hole and at a selected depth the motor is energized to extend the assemblies which extend until the ends of the caliper arms contact the side of the borehole. The tool is then pulled up, at a preselected speed, the arm assemblies being spring loaded so that as the tool passes through a borehole of varying diameter, the arms extend and retract somewhat. The arm assemblies are operatively connected to potentiometers which turn in response to assembly extension and hence in accordance with variance in borehole size. Current is passed through the potentiometers and output signals are derived therefrom which indicate the extension of the arm assemblies.

DETAILED DESCRIPTION OF A PREFERRED EMBODIMENT OF THE INVENTION

Figure 1:
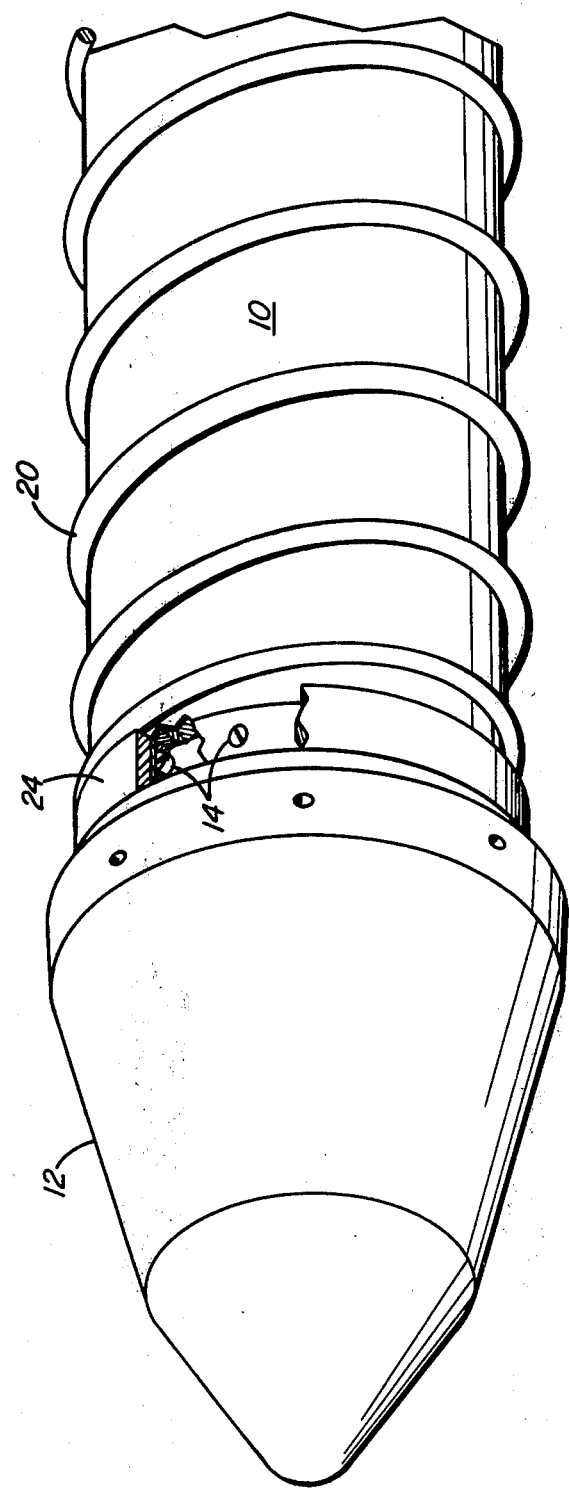
FIGS. 1–8 provide a general cutaway view of a preferred embodiment of the invention.
Figure 2:
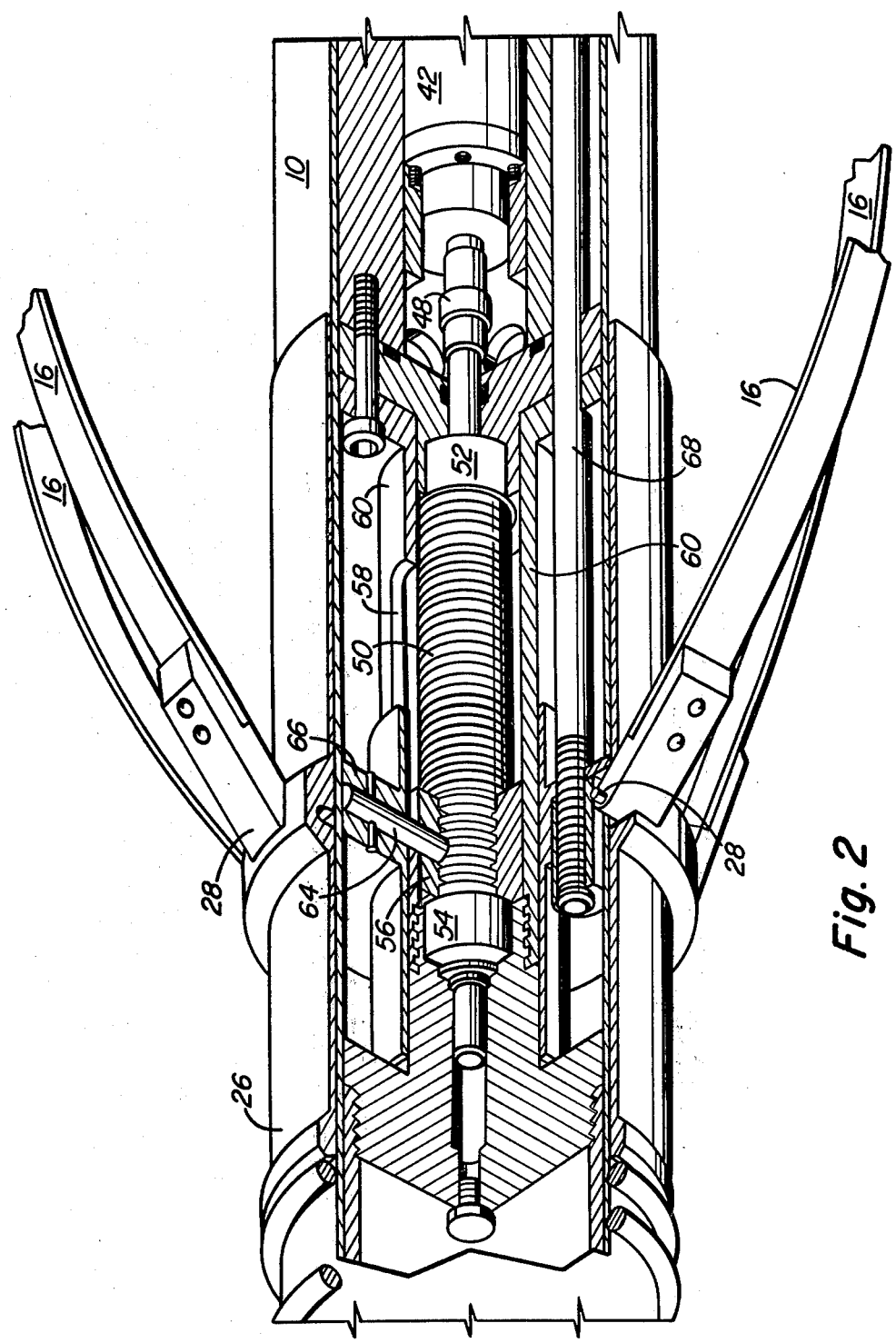
Figure 3:
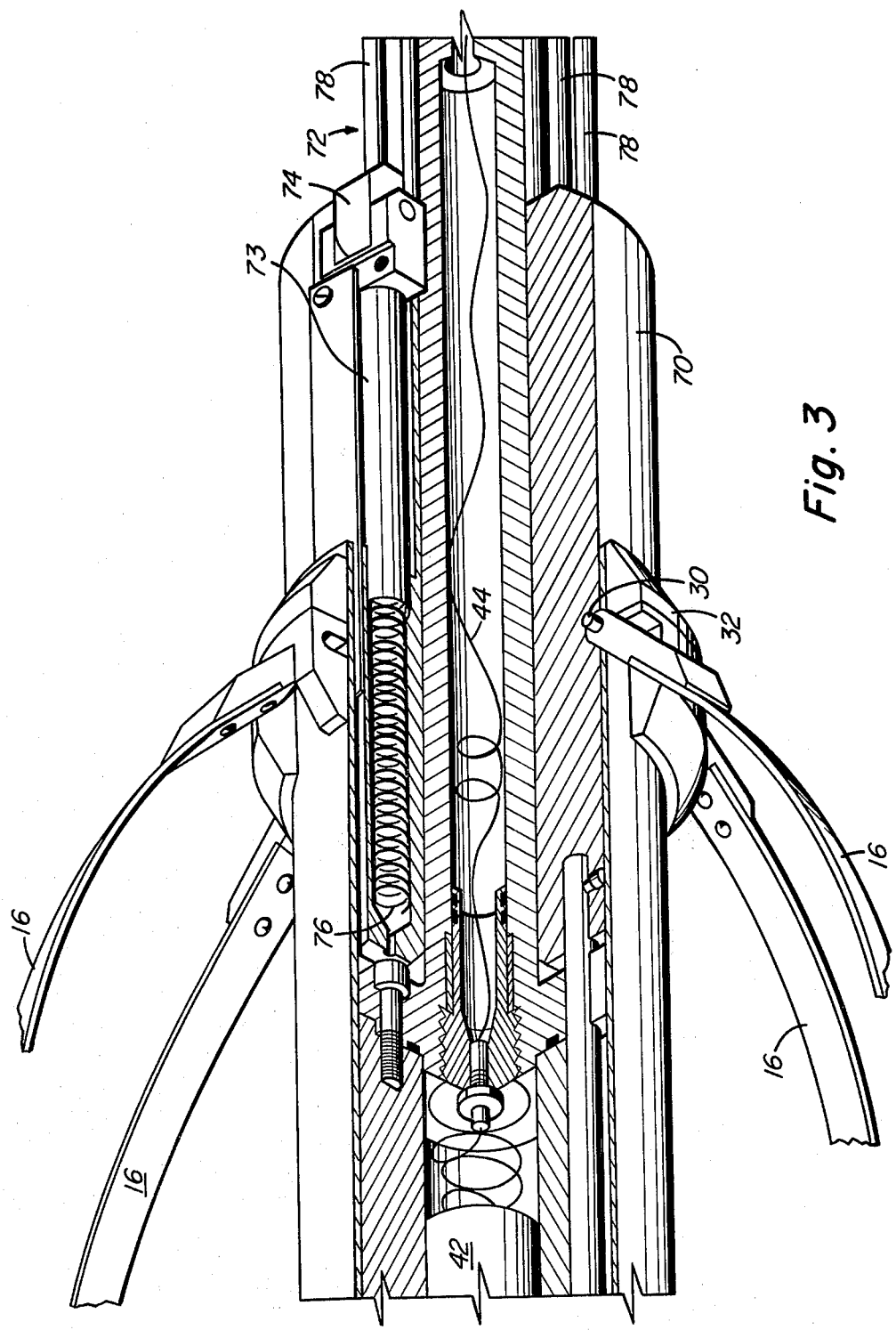
Figure 4:
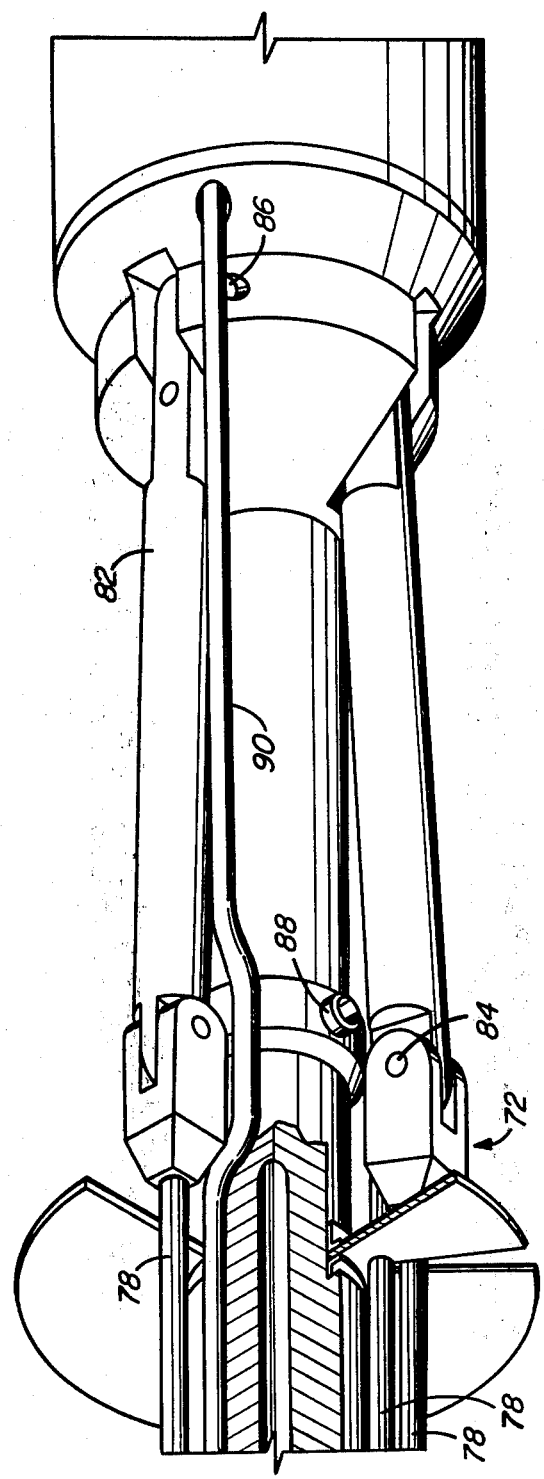
Figure 5:
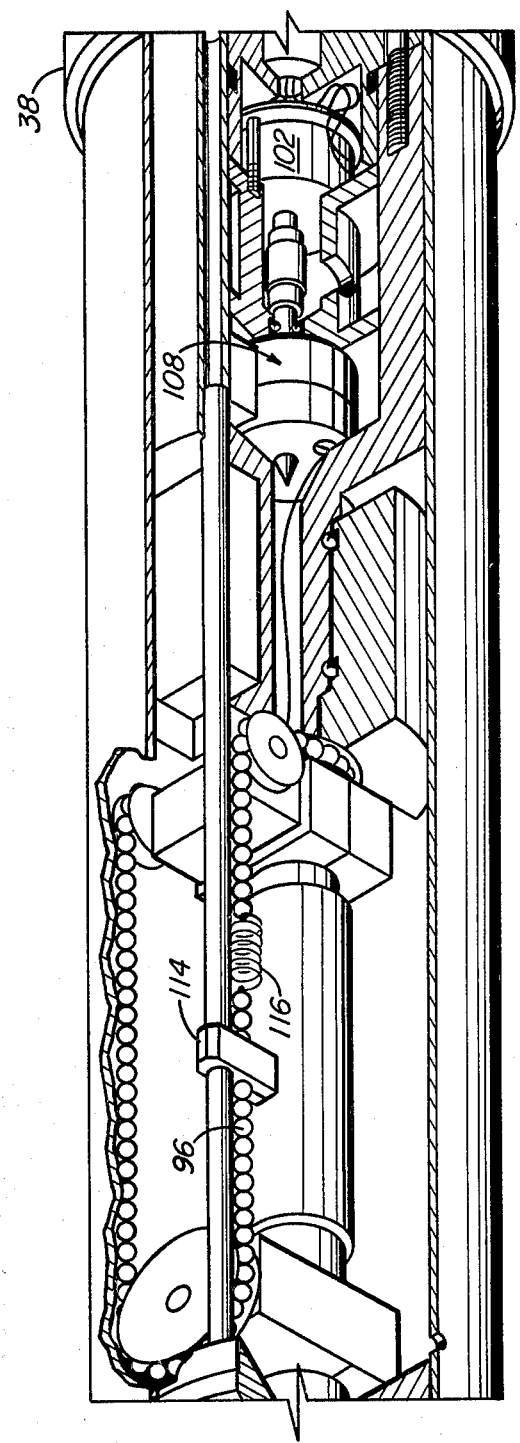
Figure 6:
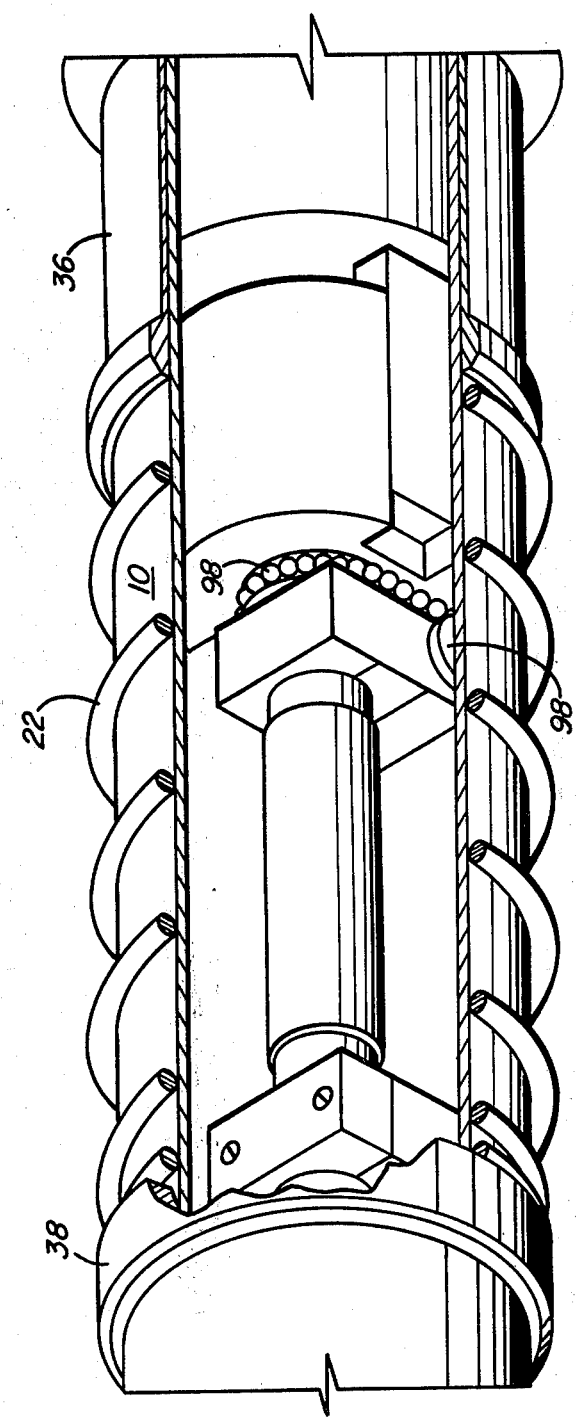
Figure 7:
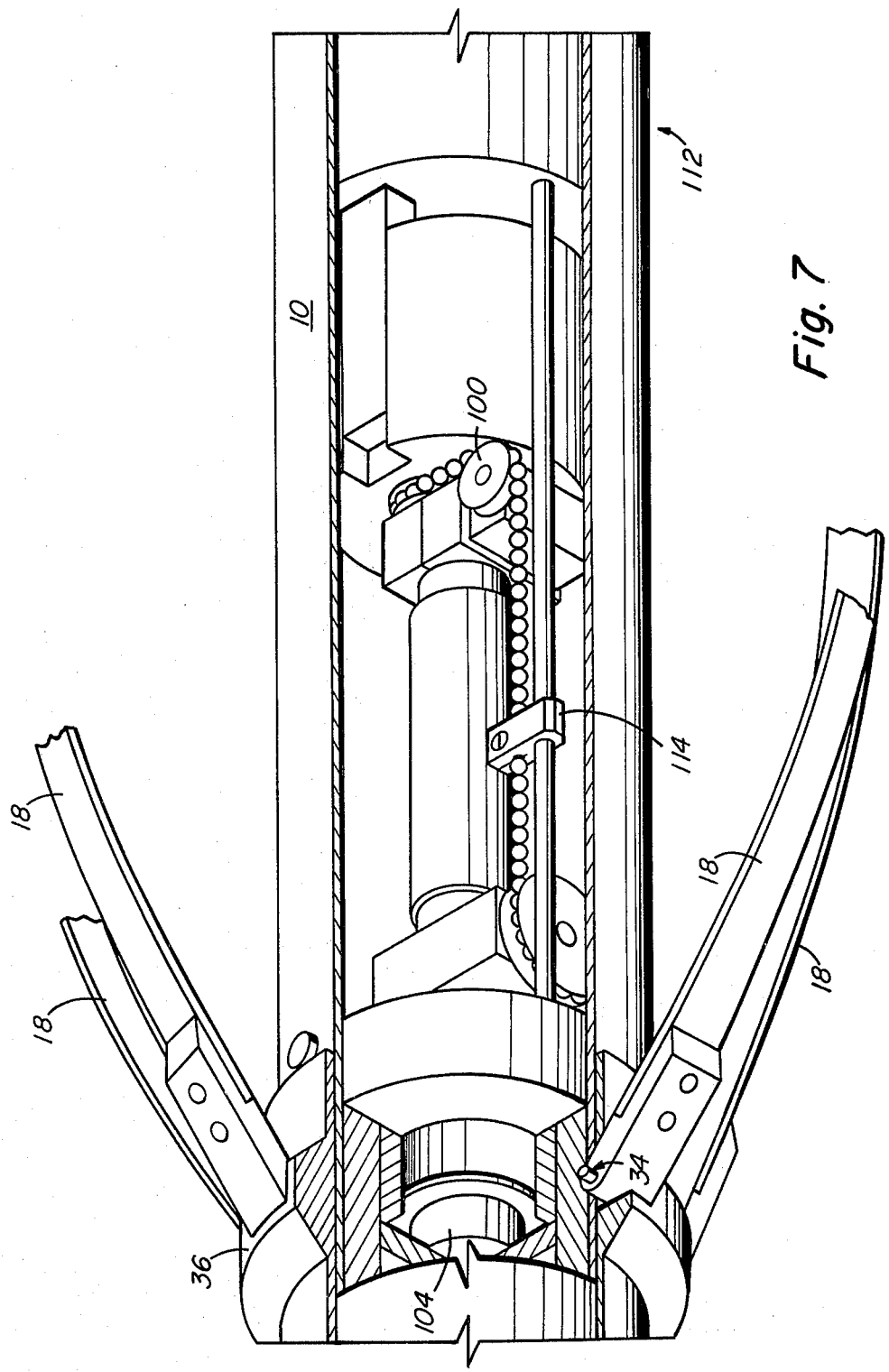
Figure 8:
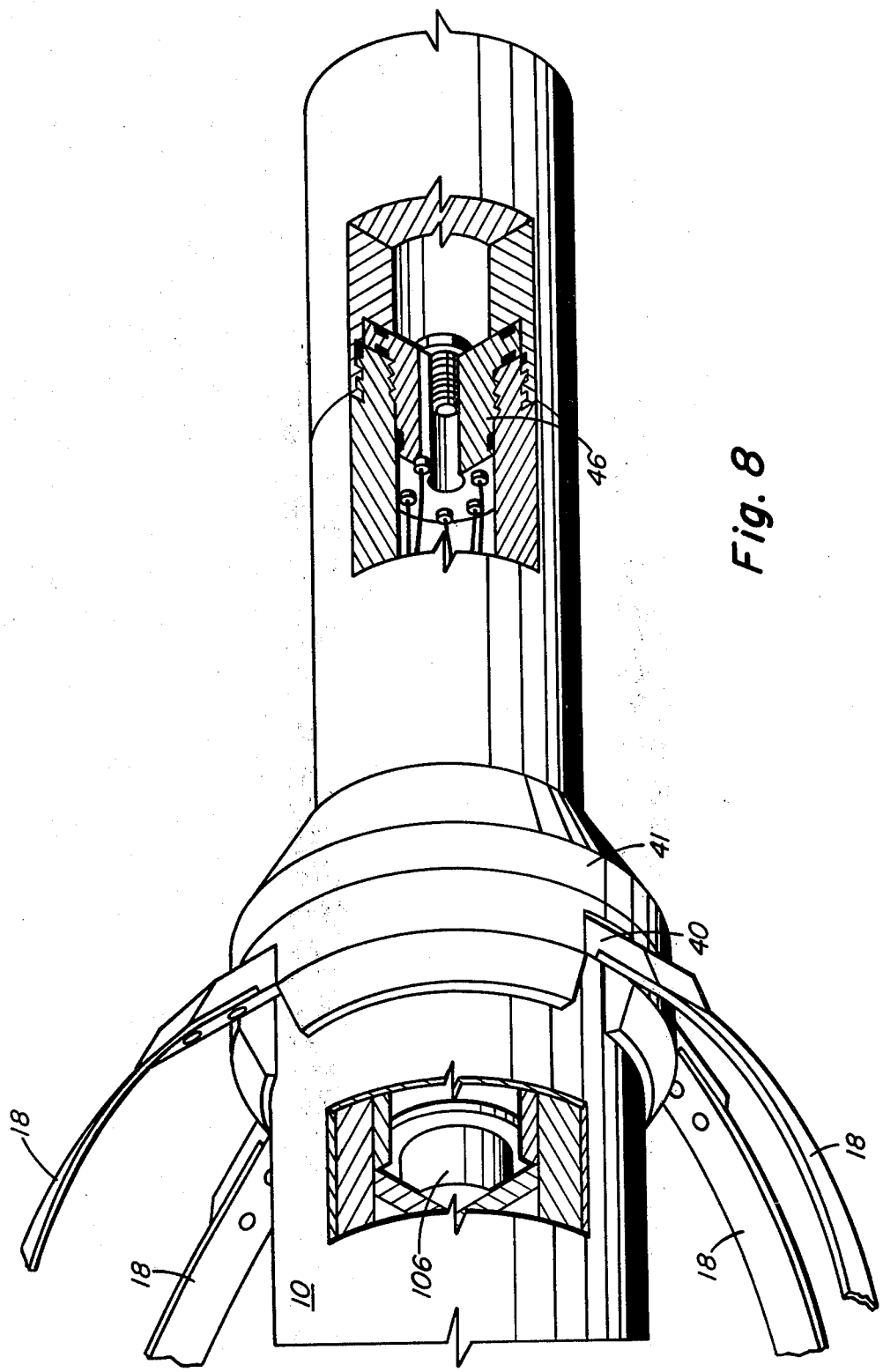
Figure 9:
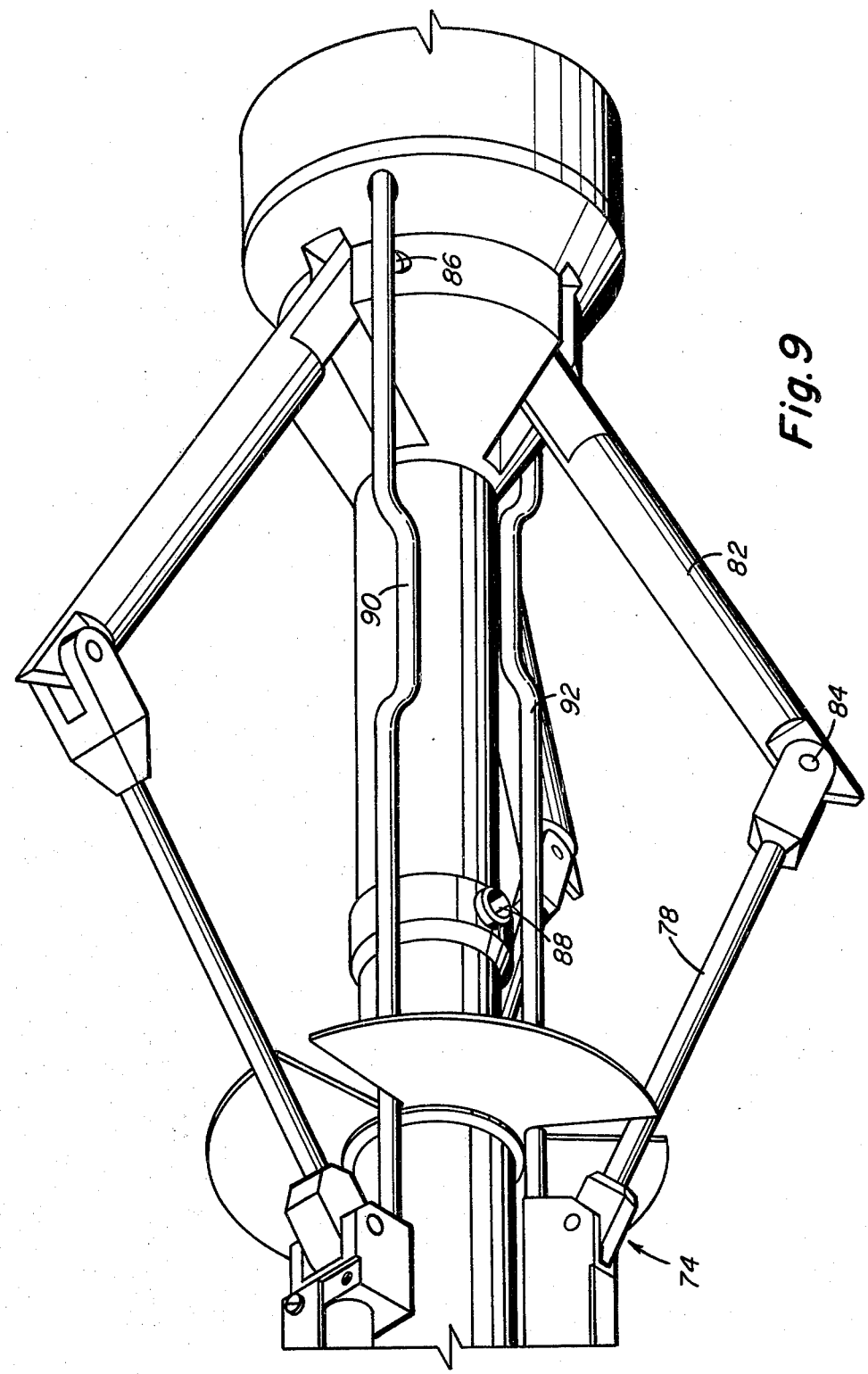
FIG. 9 shows the arm assemblies seen in FIG. 4 extended.

FIGS. 1–10 show the preferred embodiment of the invention. The tool generally comprises a longitudinal housing structure 10 having a generally conically shaped head 12 attached thereto by screws 14. At either end of the housing are a plurality of leaf springs 16 and 18 which position the tool approximately at the center of the hole. These springs are spring loaded to always be in contact with the circumference of the hole by coil springs 20 and 22. One end of coil 20 is stopped against a spring adjustor retaining ring 24 and at the other against a sleeve 26 which slides on a portion of the general housing 10. One end of each leaf spring 16 attaches to sleeve 26 at a pin hinge 28 and at the other end to a similar pin hinge 30 which is affixed to housing 10 by a retaining ring 32. Thus, as the tool is lowered or withdrawn from a hole, springs 16 will remain in contact with the wall of the hole. Similarly, springs 18 are affixed to the housing 10 at pin hinges 34 which are on a sleeve 36 held in spring tension by coil spring 22 abutting a spring base ring 38 affixed to housing 10. The other ends of springs 18 are attached to pin hinges 40 which are affixed to the housing 10 by retaining ring 41.

Disposed within housing 10 is an electric motor 42 which can be reversibly controlled from the surface through a lead 44 which passes through the housing, exiting therefrom through a bulkhead 46. Lead 44 connects to an electrical conductor line extending to the surface (not shown). Motor 42 through a coupling 48 drives a lead screw 50 mounted in ball bearing race assemblies 52 and 54. At one end of lead screw 50, as shown, is a nut 56 which slides back and forth thereupon in response to lead screw 50 being rotated by motor 42. Nut 56, through slot 58 in an inner sleeve 60 connects by pins 64 to a sliding sleeve 66 into which a connecting rod 68 is threaded. Rod 68 at its other end engages sliding member 70 which extends and retracts caliper arm assemblies 72. Thus, the extension and retraction of the caliper arms is controlled from the surface by signals passing through lead 44 to motor 42 which through the lead screw assembly, controls caliper arm extension.

Each of the three caliper arm assemblies 72 attaches to a separate spring loaded rod 73 at a pin joint structure 74. Rods 73 are spring loaded with springs 76 disposed within each rod tube so that while lead screw 50 may be rotated to extend arm assemblies 72, sufficient pressure on assemblies 72 will retract them against compression resistance from springs 76. Each arm assembly 72 comprises a collapsible arm 78 attached at a pin joint 74 to a rod 73 and at its other end to a caliper arm 82 by a pin 84. Caliper arms 82 are attached to the housing structure by pins 86.

Collapsible arms 78 preferably comprise relatively weak metal or other material such as aluminum and are designed to collapse or break if the tool is stuck in the hole and must be forcefully withdrawn.

In the preferred embodiment three arm assemblies are shown but six or more could be readily used in practicing the invention. In a preferred embodiment, each arm assembly is evenly spaced circumferentially from adjacent ones and is capable of measuring radii from about 63.5 millimeters or about 2½ inches to about 178 millimeters or about 7 inches. It will be appreciated by those skilled in the art that the arm length can be varied to measure hole diameters in a wide range, such as to about 30 inches, the tool could alternatively be designed for maximum sensitivity at selected diameters. Stops 88 are provided on the housing so that the arms when retracted will not be fully straightened; hence when lead screw 50 turns, the assemblies will open outwardly rather than attempt to move inwardly toward the center of the housing.

Figure 10:
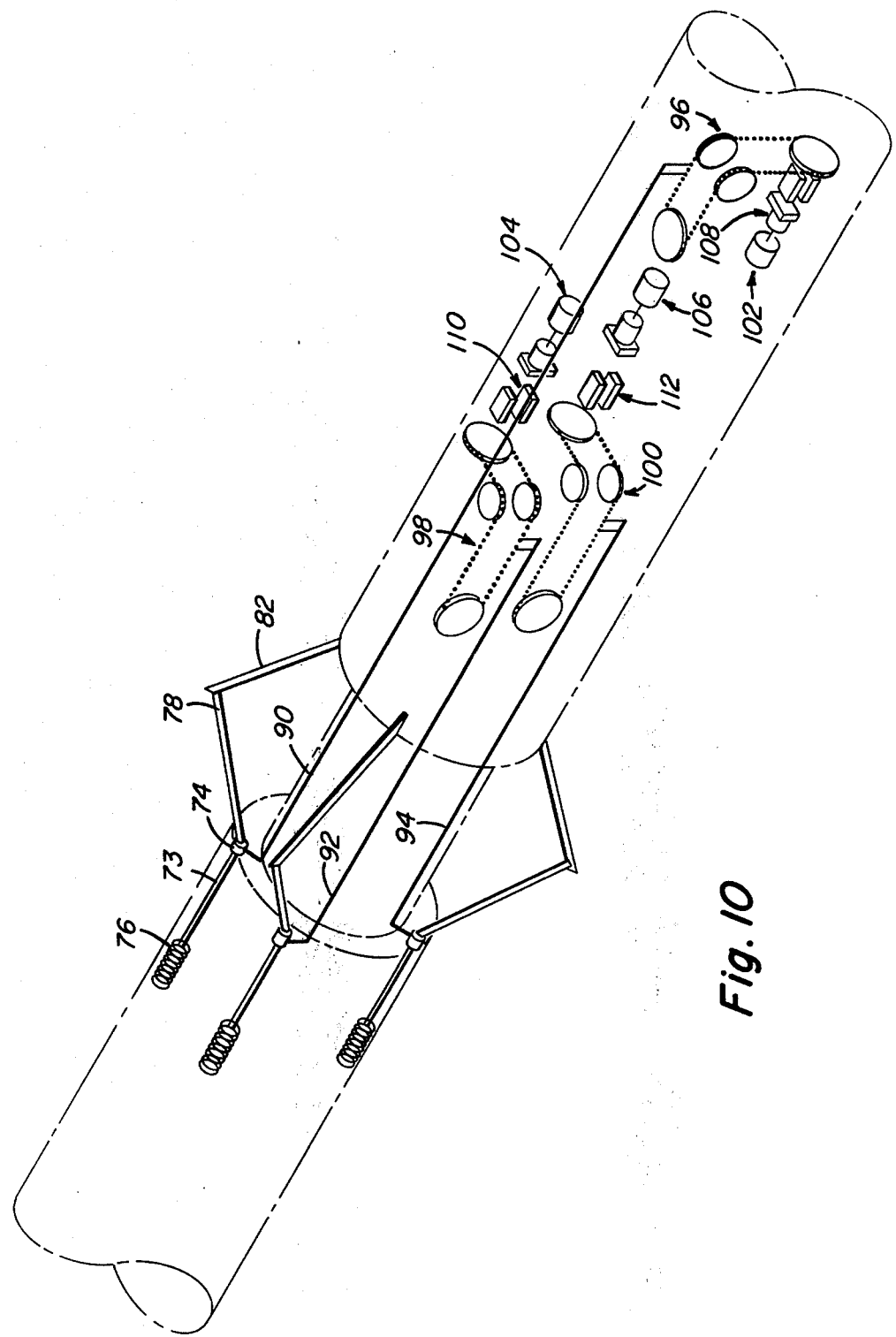
FIG. 10 schematically shows bead chain potentiometer drive-connecting rod combinations for the three arm assemblies of the preferred embodiment.

As schematically shown in FIG. 10, connecting rods 90, 92 and 94 connect to pin joints 74 at the ends of collapsible arms 78 to bead chain assemblies 96, 98, and 100 which drive potentiometers 102, 104 and 106 through magnetic couplings 108, 110, and 112. Each bead chain is attached to a slide rod by a screw set clip 114 and is provided with a spring 116 to decrease stress on the chain when an arm assembly 72 moves the slide rod connected thereto.

Figure 11:
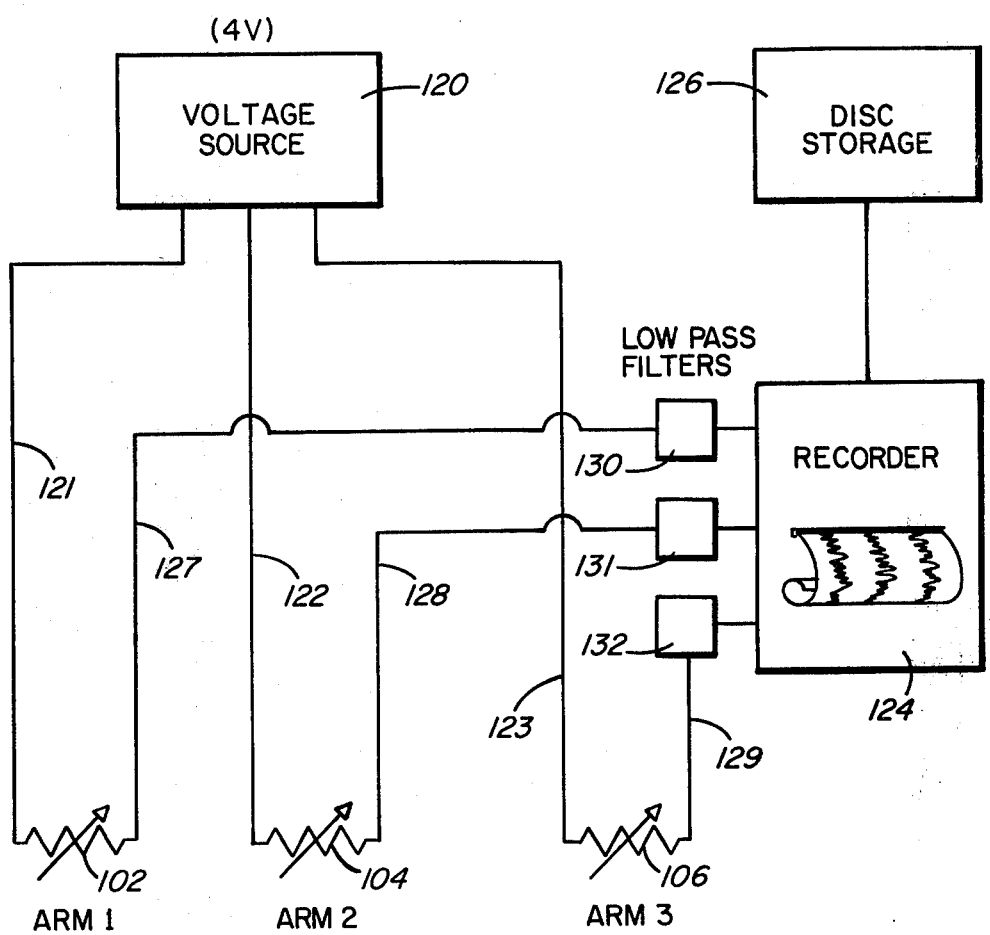
FIG. 11 is an electrical schematic of the output providing aspect of the tool.

FIG. 11 schematically shows a typical output system for use with an apparatus in accordance with the invention. As noted previously each of the arm assemblies 72 connects to a potentiometer 102, 104, or 106. A voltage source 120 located at the surface is connected to each potentiometer through lines 121, 122 and 123. The potentiometers connect to output devices such as recorder 124 and disc storrage 126 through lines 127, 128 and 129. Because of noise generally present in such systems, low pass filter 130, 131 and 132 can be used.

The foregoing description of a preferred embodiment of the invention has been presented for purposes of illustration and description and is not intended to be exhaustive or to limit the invention to the precise form disclosed. It was chosen and described in order to best explain the principles of the invention and their practical application to thereby enable others skilled in the art to best utilize the invention in various embodiments and with various modifications as are suited to the particular use comtemplated. It is intended that the scope of the invention be defined by the claims appended hereto.

What is claimed is:

1. A bore hole caliper and contour determining tool suspendible from a logging cable comprising:
   a housing having a head and an uphole end, said housing being generally tubular about a longitudinal axis, and containing a reversible electric motor and means for connecting said motor to a source of electricity to drive it;
   means disposed about said housing near said head and said uphole end for centering said housing within a borehole;
   a plurality of extendable and retractable arm assemblies disposed about said housing and longitudinally aligned with said housing axis, each said assembly comprising a caliper arm and a collapsible arm pivotally connected together, each of said caliper and collapsible arms having a first and a second end, said caliper and collapsible arms being connected together essentially at said first end, said second ends of each said caliper arm being pivotally affixed to said housing;
   means operatively connected to said motor and to said second ends of said collapsible arms for moving said second ends longitudinally along said housing;
   spring loaded means operatively connected to said arm assemblies to allow each such assembly to extend and retract independently of each other such assembly as said tool is pulled through a borehole; and
   means for producing electrical signals representative of said independent extension and retraction of said arm assemblies to provide an output representative of the contour of a borehole.

2. The invention of claim 1 wherein said collapsible arms comprise longitudinal members relatively weak compared to said caliper arms, said collapsible arm being designed to break if said tool is stuck in said borehole and forcefully withdrawn therefrom.

3. The invention of claim 1 wherein said caliper arms have ends which slide against the walls of a borehole, said caliper arm ends extending beyond the connection of said caliper arms and collapsible arms.

4. The invention of claim 1 wherein the other ends of said collapsible arms are connected to said spring loaded means which extends and retracts said arm assemblies.

5. The invention of claim 4 wherein said other ends of said collapsible arms connect to follower arm rods which connect to bead chains, said bead chains being operatively connected to potentiometers.

6. The invention of claim 5 wherein said bead chains connect to said potentiometers through magnetic couplers.

* * * * *